United States Patent
Mourousoglou

(10) Patent No.: US 11,143,292 B2
(45) Date of Patent: Oct. 12, 2021

(54) OPERATING METHOD FOR A HYDRAULIC SYSTEM OF AN AUTOMATIC TRANSMISSION

(71) Applicant: ZF Friedrichshafen AG, Friedrichshafen (DE)

(72) Inventor: Dimitrios Mourousoglou, Ertingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 670 days.

(21) Appl. No.: 15/995,771

(22) Filed: Jun. 1, 2018

(65) Prior Publication Data

US 2018/0355968 A1    Dec. 13, 2018

(30) Foreign Application Priority Data

Jun. 13, 2017    (DE) .................... 10 2017 209 905.4

(51) Int. Cl.
| | | |
|---|---|---|
| F16H 61/00 | (2006.01) | |
| F16H 61/02 | (2006.01) | |
| F16H 59/72 | (2006.01) | |
| F16H 61/462 | (2010.01) | |

(52) U.S. Cl.
CPC ......... F16H 61/0031 (2013.01); F16H 59/72 (2013.01); F16H 61/0021 (2013.01); F16H 61/0206 (2013.01); F16H 61/462 (2013.01); *F15B 2211/20515* (2013.01); *F15B 2211/50536* (2013.01); *F15B 2211/526* (2013.01); *F16H 2061/0037* (2013.01); *F16H 2061/0068* (2013.01); *F16H 2312/14* (2013.01)

(58) Field of Classification Search
CPC ............. F16H 61/0031; F16H 61/0206; F16H 61/0021; F16H 61/46; F16H 61/462; F16H 61/0009; F16H 2061/0037; F16H 2312/14; F16H 2312/20
See application file for complete search history.

(56) References Cited

U.S. PATENT DOCUMENTS

| | | | |
|---|---|---|---|
| 8,825,347 B2 * | 9/2014 | Yamada .............. | F16H 61/0031 701/112 |
| 9,222,576 B2 | 12/2015 | Knoth et al. | |
| 2007/0240919 A1 * | 10/2007 | Carlson .................. | B60K 25/00 180/53.4 |

(Continued)

FOREIGN PATENT DOCUMENTS

| | | |
|---|---|---|
| DE | 102015107628 A1 | 11/2015 |
| DE | 102015205199 A1 | 9/2016 |

(Continued)

OTHER PUBLICATIONS

German Search Report DE102017209905.4 dated Jan. 23, 2018. (10 pages).

*Primary Examiner* — Charles A Fox
*Assistant Examiner* — Ryan P Dodd
(74) *Attorney, Agent, or Firm* — Dority & Manning, P.A.

(57) ABSTRACT

A method for operating a hydraulic system for an automatic transmission includes determining a defined primary pressure value (p_PE) to be adjusted based on a measurement of an input current (I_22) of an electric motor and also includes adjusting a secondary flow rate (Q_SZ) to be adjusted based on calculation and adjustment of a target speed (n_Z) of the electric motor.

10 Claims, 2 Drawing Sheets

(56) References Cited

U.S. PATENT DOCUMENTS

2009/0232673 A1* 9/2009 Reisch ............... F16H 61/0031
                                                    417/364
2018/0106363 A1* 4/2018 Katakura ............ F16H 61/0031

FOREIGN PATENT DOCUMENTS

DE    102015210166 A1    12/2016
DE    102016204399 A1     9/2017

* cited by examiner

OPERATING METHOD FOR A HYDRAULIC SYSTEM OF AN AUTOMATIC TRANSMISSION

FIELD OF THE INVENTION

The invention relates generally to a method for operating a hydraulic system for an automatic transmission, in particular for adjusting a lube oil and/or cooling oil flow in a hydraulic circuit.

BACKGROUND

The non-previously published patent application DE102016204399.4 belonging to the applicant describes an automatic transmission including an electrically driven pump, the hydraulic system of which includes a primary and a secondary hydraulic circuit, which are also referred to in the following as the primary and the secondary circuits. The electrically driven pump is also referred to in the following as IEP (for "integrated electric pump"). In this case, the primary circuit supplies the hydraulic control and the shift elements, such as clutches and brakes, with the operating medium for the actuation thereof. In the secondary circuit, elements of the automatic transmission to be lubricated and cooled are supplied. Thus, the secondary circuit is also referred to as the lube oil/cooling oil circuit. The maximum pressures to be set in the primary circuit are higher than the highest pressures to be set in the secondary circuit. The hydraulic circuit of the automatic transmission includes, in addition to the IEP, a pump driven by the drive motor of the vehicle. This is also referred to in the following as the primary pump. The two pumps can supply both the primary circuit and the secondary circuit, which are hydraulically coupled to each other by valve units, in various operating conditions. The IEP is preferably operated while the internal combustion engine driving the primary pump is at a standstill, which is the case, for example, during start-stop operation or during sailing. The "sailing" driving condition, which is also referred to as "free-wheeling", is understood to be driving without a force-fit connection between the driving wheels and the prime mover of the vehicle. This is the case, for example, when at least one clutch is disengaged in the transmission or neutral is selected (idle running).

A secondary flow rate required by the secondary circuit for lubrication or cooling, which is also referred to in the following as the lube oil amount, previously had to be determined and established by testing. A sensor unit for measuring a pressure and/or a flow rate is required for this purpose, which is a high expenditure.

SUMMARY OF THE INVENTION

Example aspects of the present invention provide a method for operating a hydraulic system, in particular for the simple, defined adjustment of the lube oil amount by an electrically driven pump in an automatic transmission. In particular, the expenditure on sensors should be minimal.

According thereto, a method for operating a hydraulic system for an automatic transmission is provided. The hydraulic system includes a primary circuit and a secondary circuit, at least one gear pump, which can be driven by an electric motor, and a valve unit. The valve unit is arranged between the primary circuit and the secondary circuit and is controllable by an electric actuating current in such a way that the primary circuit and the secondary circuit are connectable or disconnectable by the valve unit. When the primary circuit and the secondary circuit are connected, the hydraulic resistance between the two is changable by the valve unit. A hydraulic resistance is also referred to as flow resistance. In the through-flow direction of a hydraulic resistance, the pressure upstream from the hydraulic resistance is higher than downstream therefrom. The pressure difference is also referred to as pressure loss. According to the invention, a defined primary pressure value to be adjusted is determined by a measurement of the input current of the electric motor and a secondary flow rate to be adjusted is adjusted by the calculation and adjustment of a target speed of the electric motor. Advantageously, a complex sensor unit for pressure and flow rate can be omitted as a result.

In one preferred embodiment of the method, the primary circuit and the secondary circuit are disconnected from each other by the valve unit in order to determine the target speed, after which the speed of the electric motor is changed for as long as it takes for a defined input current value of the electric motor to be detected, wherein the value of the speed at which the defined input current value has set in is at least temporarily stored as a reference speed, after which a target speed at which the target secondary flow rate is achieved is determined on the basis of a desired target secondary flow rate value. The target speed is greater than the reference speed. Therefore, the speed at which the primary circuit is supplied with a sufficient flow rate at a sufficient primary pressure is known to an electronic control unit after a short time during the operation of the automatic transmission.

It is also possible that the primary circuit and the secondary circuit are automatically connected to each other again by an actuation of the valve unit after the target speed has been determined. The speed of the gear pump is subsequently increased in a controlled manner in order to adjust the defined input current value by increasing the flow rate delivered by the gear pump.

If the target speed is exceeded, the flow resistance between the primary circuit and the secondary circuit is increased by the valve unit, by way of an automatic control of the valve unit, until the speed corresponds to the target speed again and the input current of the electric motor corresponds to the defined input current value.

In the context of the method according to the invention, the term "automatically" is understood to mean that method steps are implemented by an electronic control unit or a program stored in the electronic control unit, without involvement by an operator.

Alternatively thereto, it is possible that, after the target speed has been determined, the speed is increased to the value of the target speed and, thereafter or during the change in the speed, the valve unit is controlled in such a way that the primary circuit and the secondary circuit are connected to each other again. In this case, while the target speed remains constant, the flow resistance of the valve unit is changed for as long as it takes to reach the input current value of the electric motor corresponding to the defined primary pressure value.

It is also possible that a time measurement is started when the primary circuit and the secondary circuit are disconnected and that the hydraulic connection between the primary circuit and the secondary circuit is established again by the valve unit after a certain interval has elapsed. As a result, a failure of the automatic transmission due to an undersupply of the secondary circuit that has lasted too long can be advantageously avoided.

Preferably, the valve unit is designed as a pressure control valve and includes a pressure-adjusting unit. By the pressure-adjusting unit, the pressure control valve is controllable in such a way that an opening and a closing of the pressure control valve and an adjustment of its hydraulic resistance between the primary circuit and the secondary circuit is possible.

In one advantageous embodiment, the pressure-adjusting unit is designed as an electromagnetically actuatable pressure control valve.

In this context, it is possible that the pressure control valve includes an axially displaceable valve slide and the pressure-adjusting unit is controlled by an electric control current, and therefore the pressure-adjusting unit adjusts a hydraulic control pressure which is applied to an effective area of the valve slide of the pressure control valve. An effective area of a valve slide of a pressure control valve is understood to be an area which results in a force effect on the valve slide when pressure is applied to the effective area, by way of which the valve slide can move.

In one preferred embodiment, it is provided that the hydraulic system also includes a second gear pump which can be driven by yet another drive machine, wherein, initially, the second gear pump is in operation and the first gear pump, which can be driven by the electric motor, is switched off. In this case, in order to determine the target speed, the electric motor of the first gear pump is switched on, at the latest, after the second gear pump has been switched off. Subsequent thereto, the primary circuit and the secondary circuit are disconnected from each other by the valve unit.

In yet another embodiment, it is possible that the drive machine of the second gear pump is an internal combustion engine for driving the vehicle, in which the automatic transmission is arranged.

BRIEF DESCRIPTION OF THE DRAWINGS

One exemplary embodiment of the method according to the invention and the hydraulic system operated by the method is represented in the drawings and is described in greater detail in the following.

In the drawings

DETAILED DESCRIPTION

Figure 1:
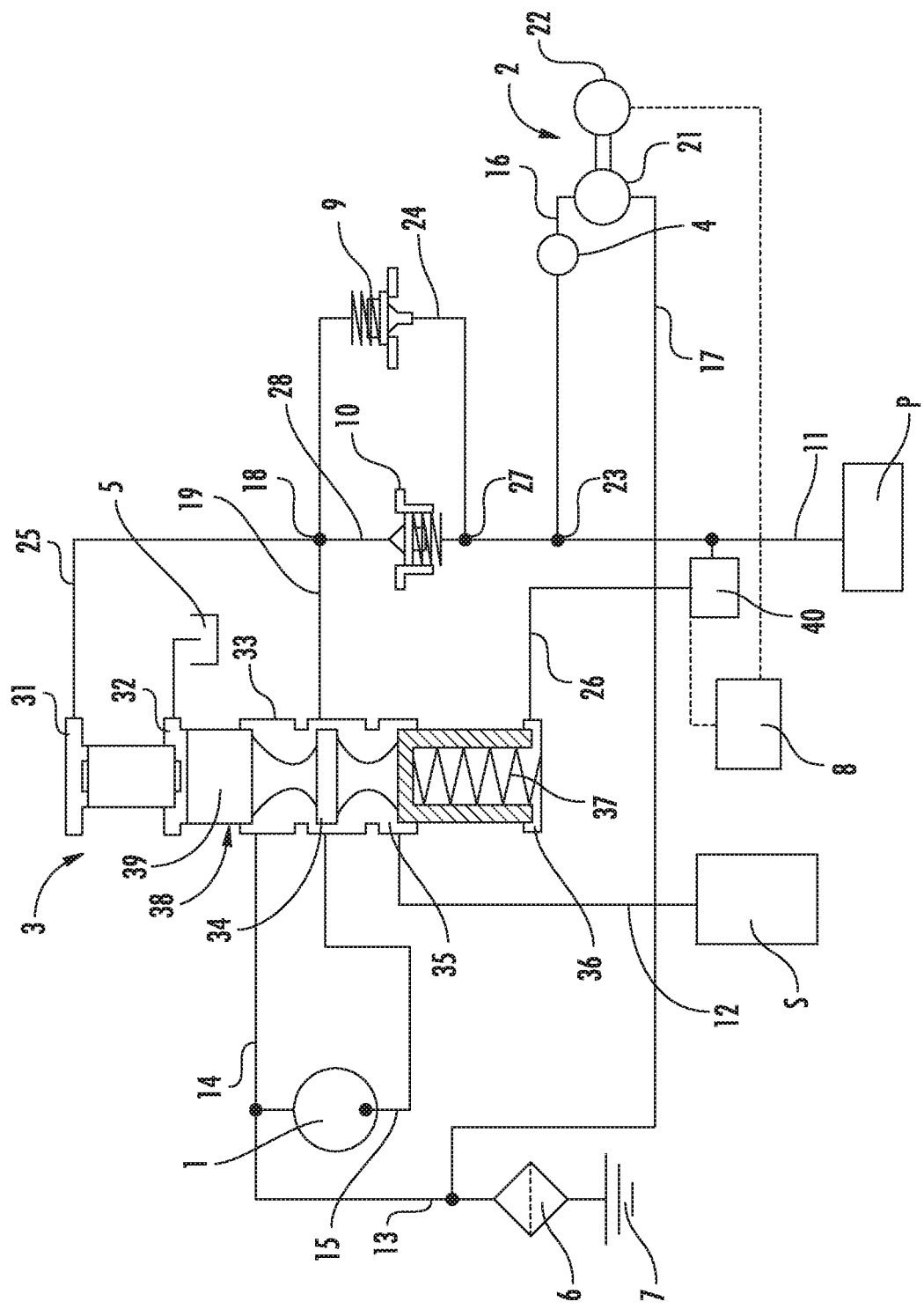
FIG. 1 shows a schematic representation of a hydraulic system including an IEP.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a schematic representation of a section of a hydraulic system which is operated by the method according to the invention. The hydraulic system includes a main pump 1, an IEP 2, and a system pressure valve 3, as well as a primary circuit P and a secondary circuit S, as consumers. The IEP 2 includes a pump 21 and an electric motor 22, by which the pump 21 can be driven. The pump 21 is connected via a pressure line 16 to a line 11 in a junction 23 with the line 11 and, in this way, delivers the operating medium into the primary circuit P during operation. A primary pressure p_P prevails in the primary circuit P. The operating medium is usually a transmission oil. A check valve 4 is arranged in the pressure line 16. In the following, a line is understood to be any device through which a fluid is conductable. A line can therefore be designed, for example, as a tube, a hose, or as a duct formed in a housing, or as a bore.

The pump 21 of the IEP 2 sucks in the operating medium through a suction line 17, a suction line 13, and a suction filter 6, from an oil sump 7 acting as a reservoir. The check valve 4 only allows a through-flow from the IEP 2 into the primary circuit P of the hydraulic system. For the case in which the IEP 2 is at a standstill, i.e., the electric motor 22 is shut off and, therefore, cannot drive the pump 21, and the hydraulic system is supplied by the main pump 1, the check valve 4 prevents a leakage of the operating medium through the pump 21 into the oil sump 7 by closing the pressure line 16. The pressure line 11 divides, in the direction toward the system pressure valve 3, at a junction 27, into two lines 24 and 28 which are joined again at a junction 18. A check valve 9 is arranged in the line 24 between the junctions 27 and 18 and a check valve 10 is arranged in the line 28, wherein the check valves 9 and 10 have different flow directions. In this way, the check valve 9 allows a through-flow from the IEP 2 to the system pressure valve 3, or from the junction 27 to the junction 18, and blocks in the opposite direction. The check valve 10 allows a through-flow from the system pressure valve 3 into the primary circuit P, or from the junction 18 to the junction 27, and blocks in the opposite direction.

The system pressure valve 3 includes six connection spaces 31 to 36 which are designed as recesses in a control housing (not shown), which are at least partially circumferential and are directed radially outwardly from a valve bore 38. The valve bore 38 includes multiple sections having different inner diameters. The connection spaces 31 to 36 enclose, preferably essentially annularly, a valve spool 39 which is axially movably arranged in the valve bore 38.

The junction 18 is connected via a line 25 to the connection space 31 and via a line 19 to the connection space 34. Therefore, the system pressure valve 3 is ultimately connected to the primary circuit P via the connection spaces 31 and 34. A connection space 33 formed between the connection spaces 34 and 32 is connected to the suction line 13 via a charging line 14. The main pump 1 sucks in the operating medium through the suction line 13. A connection space 32 formed between the connection spaces 31 and 33 is connected to a depressurized area 5. The depressurized area 5 is an area of the hydraulic system or the automatic transmission, in which at least approximately ambient pressure prevails. A space in a hydraulic system, which is connected to an area in which at least approximately ambient pressure prevails, is also referred to in the following as "vented" or "depressurized".

Also opening into the connection space 34 is a pressure line 15, through which the main pump 1 can deliver the operating medium to the system pressure valve 3, and, in fact, in any position of the valve spool 39, since the connection space 34 annularly encloses the valve spool. One connection space 35 is connected to the secondary circuit S of the hydraulic system via a line 12. One connection space 36 is connected via a line 26 to a pressure-adjusting unit 40, by which a control pressure p_ST can be adjusted in the connection space 36. The pressure-adjusting unit 40 is usually designed as an electrically controllable pressure control valve or as an electromagnetically actuatable pressure regulator which is also referred to as a "proportional valve" or an "electric pressure adjuster". In the example shown, the pressure-adjusting unit 40 is supplied with the operating medium, which is under the primary pressure p_P, from the primary circuit P. Therefore, the maximum possible control pressure p_ST cannot be greater than the primary pressure p_P.

A spring chamber 42 is formed in the valve spool 39, on the end thereof facing the connection space 36 in the installed state. A compression spring 37 is arranged in the spring chamber 42. The spring chamber 42 is usually designed as a blind hole. If the connection space 31 is non-pressurized, the valve spool 39 is displaced into a first stop position by the force of the compression spring 37. The valve spool 39 also assumes the first stop position when the control pressure p_ST is adjusted by the pressure-adjusting unit 40 in such a way that the sum of the forces of the control pressure p_ST and the compression spring 37 exceeds the compressive force of the primary pressure p_P prevailing in the connection space 31. In the first stop position, the valve spool is pressed against the end of the connection space 31. In the first stop position, the connection space 35 is disconnected from the connection space 34 and, therefore, the secondary circuit S is disconnected from the primary circuit P by the valve spool 39. A supply for cooling and lubrication is not possible in the first stop position of the valve spool 39.

If the connection space 36 is vented by the pressure-adjusting unit 40 or if the control pressure p_ST prevailing in the connection space is reduced to such an extent that the compressive force of the primary pressure p_P in the connection space 31 in connection with the pressurized areas of the valve spool 39 exceeds the sum of the forces of the compression spring 37 and the control pressure p_ST, the valve spool 39 is pressed into a second stop position against the end of the connection space 36. In the second stop position, the primary circuit P and the secondary circuit S are connected to each other via the connection spaces 34 and 35 and via a machined groove 44 in the valve spool 39.

The control pressure p_ST can be adjusted, by the pressure-adjusting unit 40, to any value at which the valve spool 39 assumes any control position. The level of a secondary flow rate Q_S sets in depending on the control position, wherein the secondary flow rate Q_S flows from the primary circuit P into the secondary circuit S and therefore also adjusts a pressure prevailing in the secondary circuit S.

When the main pump 1 is at a standstill, such as in the case of a shut-off internal combustion engine in start-stop operation or in the sailing mode, the automatic transmission is suppliable by the IEP 2. In this case, the operating medium is delivered, on the one hand, through the pressure lines 16 and 11 into the primary circuit P. In addition, the operating medium is delivered through a line 24, the check valve 9, and the line 19 to the connection space 34 and through the line 25 to the connection space 31 of the system pressure valve 3. Therefore, the pump 21 of the IEP 2 is connected in parallel to the primary circuit P and to the system pressure valve 3. By way of the circumferential connection space 34, the IEP 2 is also connected to the pressure line 15 of the main pump 1 or, more generally, to the pressure side of the main pump 1.

If a primary pressure p_P prevailing in the primary circuit P exceeds a certain value, the valve spool 39 is moved counter to a spring 37 by the axial pressure application on the valve spool, and therefore the connection space 35 and, therefore, the line 12 to the secondary circuit S are opened. Therefore, the connection spaces 34 and 35 are connected to each other and the secondary circuit S is suppliable by the IEP 2.

In an electronic control unit 8, the value of an input current I_22 of the electric motor 22 of the IEP 2 is detected and acts as a measured quantity for the pressure p generated by the IEP, since the pressure p_P behaves proportionally to the input current I_22. A speed n of the IEP or the speed of the electric motor 5 is also detected, wherein the speed n acts as a measured quantity for a flow rate Q delivered by the IEP 2. The flow rate Q and the speed n behave proportionally to each other, at least in part. If the speed n and, therefore, the flow rate Q of the IEP 2 are increased and delivered against a hydraulic resistance, the pressure increases upstream from this resistance. The input current I_22 of the IEP 2 increases so that the speed n of the IEP 2 does not drop.

Figure 2:
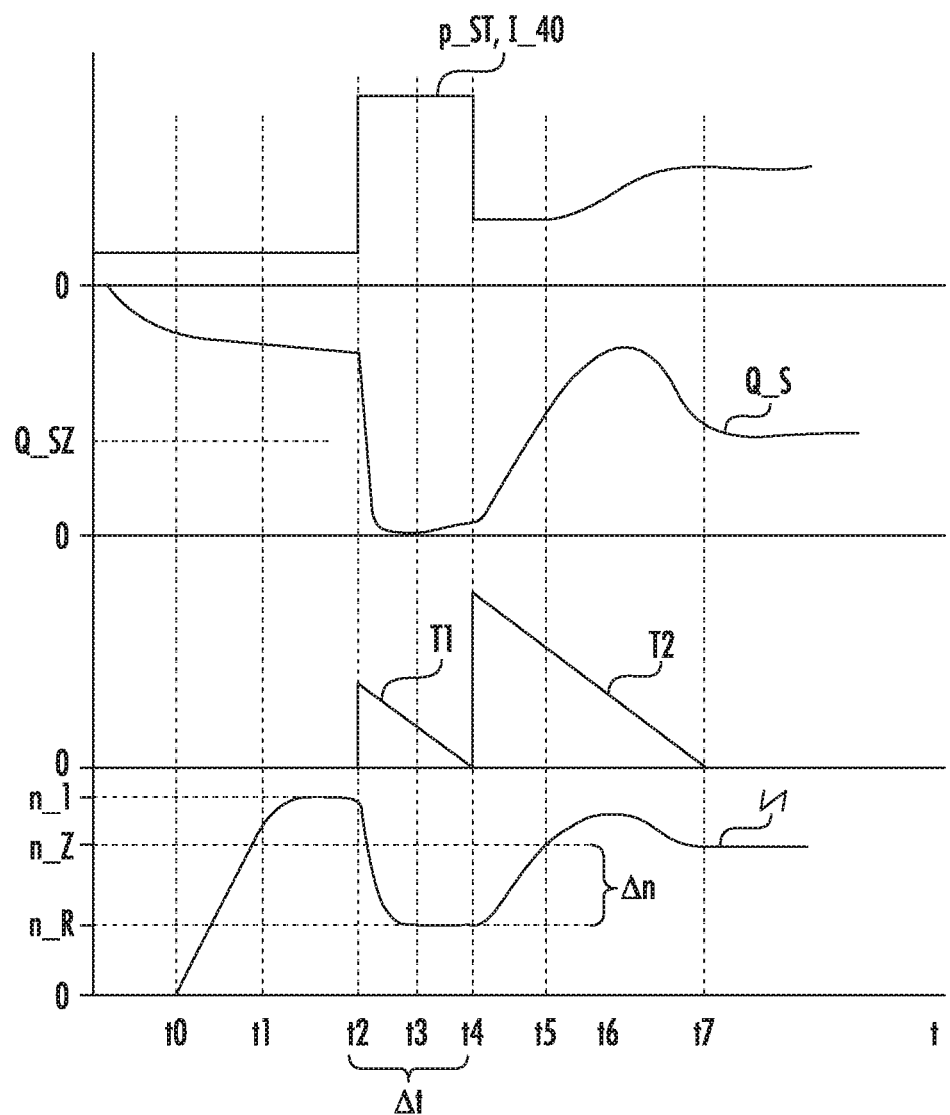
FIG. 2 shows the method according to the invention on the basis of the progressions of the relevant variables in a timing chart.

The method according to the invention is illustrated in the following in FIG. 2 on the basis of several diagrams and is described in connection with the hydraulic system which is shown in FIG. 1 and is described above. In the diagrams, the progressions of the following relevant operating variables are represented over a time axis t: a speed n of the IEP 2, the control pressure p_ST (or the control current I_40 corresponding to the control pressure), the secondary flow rate Q_S, and the time progressions T1 and T2.

Shortly before a point in time t0, the internal combustion engine, which is utilized for driving the vehicle and also drives the main pump 1, is shut off, and therefore a flow rate Q_S delivered in the secondary circuit S by the main pump decreases. At a point in time t0, the IEP 2 is switched on, and its delivered flow rate Q is increased by way of the increase in its speed n, with consumption of an electric input current I_22. In the case of a positive displacement pump, the speed and the delivered flow rate ideally behave in a proportional manner. After the IEP 2 is switched on, its speed n increases and, starting at a point in time t1, remains at a speed n1. The speed n is measured as well as adjusted in the electronic control unit 8. Due to the switching-on of the IEP 2 during the reduction in the secondary flow rate Q_S previously delivered by the main pump 1, the secondary flow rate cannot collapse. Instead, the secondary flow rate is stabilized at a level which suffices for supplying the secondary circuit S.

Starting at the point in time t0, the input current I_22 of the IEP 2 also increases when the IEP 2 is switched on, in order to accelerate its speed n and generate a pressure p_P by the IEP 2 due to the increase in the flow rate Q, which is delivered by the IEP, in the primary circuit P. Outside the acceleration phases of the IEP 2, the input current I_22 and the pressure p_P generated by the IEP 2 behave proportionally to each other, as described above.

Starting at the point in time t1, only the IEP 2 supplies, at the delivered flow rate Q, both the primary circuit P at a primary flow rate at a primary pressure p_P which sets in, as well as the secondary circuit S at a secondary flow rate Q_S. Now a defined pressure value p_PE is to be adjusted in the primary circuit P and a sufficient target secondary flow rate Q_SZ is to be adjusted in the secondary circuit S.

An assignment of the input current I_22 to the primary pressure p_P generated by the IEP 2 was previously determined by testing. This assignment was stored in the electronic control unit 8 in the form of a characteristic map or a function or a calculation model. As a result, it is advantageously possible that the primary pressure p_P can be determined by measuring the input current I_22, without the need for a pressure sensor for this purpose.

Both the primary circuit P and the secondary circuit S are to be supplied at a sufficient flow rate by adjusting a defined target speed n_Z. To this end, according to the method according to the invention, the pressure-adjusting unit 40 is controlled with a control current I_40 at the point in time t2 in such a way that the control pressure p_ST is applied to the connection space 36. The control pressure is selected to be so high in this case that the valve spool 39, assisted by the force of the compression spring 37, is displaced into its first stop position against the primary pressure p_P prevailing in the connection space 31.

In the first stop position of the valve spool 39, the connection spaces 34 and 35 and, therefore, the primary circuit P and the secondary circuit S are disconnected from each other, and therefore operating medium from the IEP 2 can now no longer enter the secondary circuit S. As a result, the secondary flow rate Q_S collapses, i.e., decreases to a value close to or equal to zero. A supply of the cooling and lubrication in the secondary circuit S now no longer takes place. This state must not exist for more than a short time, since damage to the automatic transmission can occur otherwise. For this reason, a timer optionally starts at the point in time t2, as represented by the progression of a timer signal T. When the timer runs out at the point in time t4, the secondary circuit S is supplied with the operating medium again, and therefore the cooling and lubrication in the secondary circuit S is not withheld for too long.

The IEP 2 now exclusively supplies the primary circuit P, in which a defined pressure p_PE must be maintained and a flow caused by leakage losses must be replenished.

The speed n of the IEP 2—and, therefore, the flow rate delivered by the IEP—is now controlled or changed, starting at the point in time t2, for as long as it takes for the input current I_22 detected in the electronic control unit 8 to reach the input current value I_22E. The input current is consumed by the IEP 2 when the IEP generates a pressure at the level of a defined primary pressure value p_PE. The assignment of the detected input current I and the primary pressure p_P generated at this input current is taken from a previously compiled characteristic map or a calculation function, as described above. The speed value which is detected when the input current I reaches the input current value I_22E is temporarily stored as a reference speed n_R. In the exemplary embodiment shown, the speed n is reduced starting at the point in time t2, in order to control the speed. The reference speed n_R is reached at a point in time t3 at the latest, and therefore this point in time is also referred to as the reference point in time.

The timer progression T reaches the zero line at a point in time t4, at which the adjustment of the reference speed n_R should be completed, since the lubrication and cooling in the secondary circuit S should not be interrupted for a longer time than a defined time period Δt which results from the difference between the points in time t4 and t2 as Δt=t4−t2. In practical applications, the time period is preferably limited to Δt=1 sec.

Now that the demand of the primary circuit P for flow rate and pressure is covered by the IEP 2, the secondary circuit S is to be supplied with a defined target secondary flow rate Q_SZ which is delivered by the IEP 2 in addition to the flow rate flowing in the primary circuit P. Since the flow rate Q delivered by the IEP 2 increases in proportion to its speed n, a speed increase Δn, by which the reference speed n_R must be increased in order to reach the defined target secondary flow rate Q_SZ, is determined in the electronic control unit 8. A target speed n_Z (n_Z=n_R+Δn) is therefore calculated as the sum of the reference speed n_R and the speed increase Δn. The target speed n_Z is determined at the point in time t4 at the latest.

In order to be able to supply the secondary circuit S with the operating medium again, the control pressure p_ST in the connection space 36 is reduced by controlling the pressure-adjusting unit 40, at the point in time t4, to such an extent that the valve spool 39 under the primary pressure p_P is moved out of its first stop position either into a second stop position or into a control position between the two stop positions. In its second stop position, the valve spool 39 rests, via its end on which the compression spring 37 is arranged, against the control housing in the connection space 36. In the control position or the second stop position, the connection spaces 34 and 35 are connected to each other again via a maximum flow cross-section and the operating medium flows into the secondary circuit S. Since too much operating medium would flow out of the primary circuit P in such a case, the control pressure p_ST or the current I_40 controlling the pressure-adjusting unit 40 is preferably selected in such a way that the valve spool 39 is located in a control position between the two stop positions.

Due to the outflow of the secondary flow rate Q_S from the primary circuit P, the primary pressure p_P verges on dropping below the previously adjusted, defined pressure value p_PE. Since the electronic control unit 8 perceives this by way of the measured input current I of the IEP 2, the speed n of the IEP 2 is increased, with the objective of holding the defined pressure value p_PE or of reaching the defined pressure value again if the primary pressure p_P has already fallen below the defined pressure value.

If the speed n now exceeds the target speed n_Z, at a point in time t5, without having reached the pressure value p_PE, the secondary flow rate Q_S is too high. When the target speed n_Z is exceeded, the pressure-adjusting unit 40 is controlled by the electronic control unit 8 in such a way that the control pressure p_ST is increased starting at the point in time t5. As a result, the control position of the valve spool 39 is changed and the flow cross-section from the primary circuit P to the secondary circuit S is reduced. As the control pressure p_ST increases, the gradients of the secondary flow rate Q_S and the speed n decrease until they have reached a maximum, at a point in time t6, and decrease over time until the target speed n_Z, a target secondary flow rate Q_SZ, and the pressure value p_PE have been reached, at a point in time t7. Therefore, both the primary circuit P and the secondary circuit S are sufficiently supplied with the operating medium and the IEP 2 takes up only the electrical energy required for an oil supply according to demand. Advantageously, the adjustment of the secondary flow rate Q_S to the target secondary flow rate Q_SZ, i.e., the correct amount of lube oil, is possible by the measurement and adjustment of the speed n of the electric motor 22, the electric current I_40 for controlling the pressure-adjusting unit 40, and the electric current I_22 consumed by the electric motor 22. Otherwise, undefined lube oil conditions would prevail in the transmission and the durability could not be ensured. A complex sensor unit for measuring pressures and flow rates can be omitted.

Optionally, a second timer signal T2 can be started at the point in time t4, which runs out at the point in time t7. After the timer signal T2 has run out, neither the speed n nor the current I_40 controlling the pressure-adjusting unit 40 is changed.

Modifications and variations can be made to the embodiments illustrated or described herein without departing from the scope and spirit of the invention as set forth in the appended claims.

REFERENCE CHARACTERS 1 main pump
2 IEP
3 system pressure valve
4 check valve
5 depressurized area, non-pressurized area
6 filter
7 oil sump
8 electronic control unit
9 check valve
10 check valve
11 line
12 line
13 suction line
14 charging line
15 pressure line
16 pressure line
17 suction line
18 junction
19 line
21 pump
22 electric motor
23 junction
24 line
25 line
26 line
27 junction
28 line
31 connection space
32 connection space
33 connection space
34 connection space
35 connection space
36 connection space
37 compression spring
38 valve bore
39 valve spool
40 pressure-adjusting unit
P primary circuit
S secondary circuit
I_22 IEP input current
I_22E defined input current value (corresponds to pressure value p_PE)
I_40 pressure-adjusting unit control current
n IEP speed
n_R reference speed
n_Z target speed
Δn speed increase (Δn=n_Z−n_R)
p_P primary pressure (after IEP)
p_PE defined primary pressure value
p_ST control pressure
Q flow rate
Q_P primary flow rate
Q_S secondary flow rate, cooling oil flow, lube oil amount
Q_SZ target secondary flow rate
T1 timer progression
T2 timer progression
t time, time axis
t0 point in time
t1 point in time
t2 point in time
t3 point in time
t4 point in time
t5 point in time
t6 point in time
t7 point in time
Δt defined time period (Δt=t4−t2)

The invention claimed is:

1. A method for operating a hydraulic system of an automatic transmission, the hydraulic system including a primary circuit (P), a secondary circuit (S), at least one gear pump (2, 21) and one valve unit (3), the gear pump (21) operable by an electric motor (22), the valve unit (3) arranged between the primary circuit (P) and the secondary circuit (S), the valve unit (3) controllable such that the primary circuit (P) and the secondary circuit (S) are connectable and disconnectable by the valve unit (3), a hydraulic resistance between the primary and secondary circuits (P, S) is changeable by the valve unit (3) when the primary circuit (P) and the secondary circuit (S) are connected, the method comprising:
measuring an input current (I_22) of the electric motor;
determining a defined primary pressure value (p_PE) for the primary circuit (P) based on the measured input current (I_22) of the electric motor (22);
adjusting a primary pressure (p_P) of the primary circuit (P) to the defined primary pressure value (p_PE);
calculating a target speed (n_Z) of the electric motor (22); and
adjusting a secondary flow rate (Q_S) of the secondary circuit (S) to a target secondary flow rate (Q_SZ) by changing a speed (n) of the electric motor (22) to the calculated target speed (n_Z).

2. The method of claim 1, wherein calculating the target speed (n_Z) of the electric motor (22) comprises:
disconnecting the primary circuit (P) and the secondary circuit (S) with the valve unit (3);
after disconnecting the primary circuit (P) and the secondary circuit (S) with the valve unit (3), automatically changing the speed (n) of the electric motor (22) until a defined input current value (I_22E) of the electric motor (22) is detected;
at least temporarily storing the speed (n) of the electric motor (22) at the defined input current value (I_22E) of the electric motor (22) as a reference speed (n_R); and
after storing the reference speed (n_R), calculating the target speed (n_Z) of the electric motor (22) based on a desired target secondary flow rate value (Q_SZ), the target speed (n_Z) of the electric motor (22) being greater than the reference speed (n_R).

3. The method of claim 2, further comprising:
after the target speed (n_Z) is calculated, automatically connecting the primary circuit (P) and the secondary circuit (S) by actuating the valve unit (3);
increasing the speed (n) of the electric motor (22) in a controlled manner in order to adjust the defined input current value (I_22E) by an increase in a flow rate (Q) delivered by the gear pump (2); and
when the target speed (n_Z) is exceeded, increasing the hydraulic resistance between the primary circuit (P) and the secondary circuit (S) by the valve unit (3) until the speed (n) of the electric motor (22) again corresponds to the target speed (n_Z) and the input current (I_22) of the electric motor (22) corresponds to the defined input current value (I_22E).

4. The method of claim 2, further comprising:
after the target speed (n_Z) has been calculated, increasing the speed (n) of the electric motor (22) to the target speed (n_Z);
after or while the speed (n) of the electric motor (22) is increased, controlling the valve unit (3) such that the primary circuit (P) and the secondary circuit (S) are again connected; and while the target speed (n_Z) remains constant, changing the hydraulic resistance between the primary circuit (P) and the secondary circuit (S) by the valve unit (3) until the defined primary pressure value (p_PE) is reached.

5. The method of claim 1, further comprising:
starting a time measurement (T1) when the primary circuit (P) and the secondary circuit (S) are disconnected; and
after a certain time period (Δt=t4−t2) has elapsed, establishing the hydraulic connection between the primary circuit (P) and the secondary circuit (S) again by the valve unit (3) in order to avoid a failure of the automatic transmission due to an undersupply of the secondary circuit (S).

6. The method of claim 1, wherein the valve unit (3) is a pressure control valve and comprises a pressure-adjusting unit (40), the pressure control valve controllable with the pressure-adjusting unit (40) such that opening and closing of the pressure control valve adjusts the hydraulic resistance between the primary and secondary circuits (P, S).

7. The method of claim 6, wherein the pressure-adjusting unit is an electromagnetically actuated pressure control valve (40).

8. The method of claim 7, wherein the pressure control valve (3) comprises an axially displaceable valve slide (39) and the pressure-adjusting unit (40) is controlled by an electric control current (I_40) such that the pressure-adjusting unit adjusts a hydraulic control pressure (p_ST) which is applied to an effective area of the valve slide (39) of the pressure control valve (3).

9. The method of claim 1, wherein:
the hydraulic system comprises a second gear pump (1) which is operable by an additional drive machine;
prior to adjusting the primary pressure (p_P) to the defined primary pressure value (p_PE), the second gear pump (1) is operating and the first gear pump (2, 21) is switched off; and
to calculate the target speed (n_Z), the electric motor (22) is switched on no later than after the second gear pump (1) has been switched off and the primary circuit (P) and the secondary circuit (S) are disconnected by the valve unit (3).

10. The method of claim 9, wherein the additional drive machine of the second gear pump (1) is an internal combustion engine for driving the vehicle in which the automatic transmission is arranged.

* * * * *